Feb. 19, 1952   R. VELUT   2,586,399
DEVICE FOR COLLECTING LIQUIDS
Filed July 22, 1947   2 SHEETS—SHEET 1
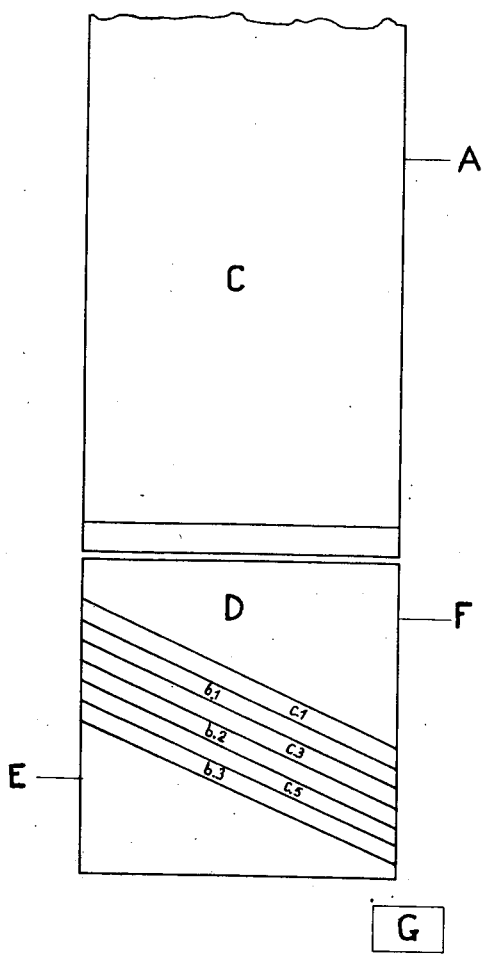
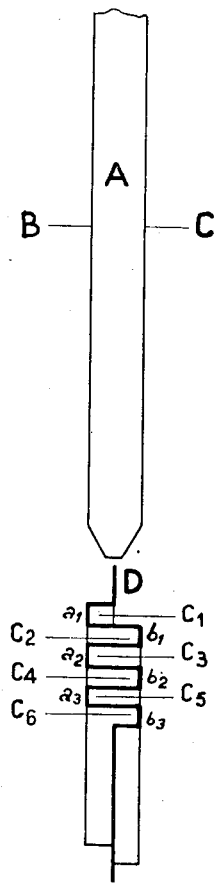
INVENTOR
Rene Velut
By Watson, Cole, Grindle & Watson Feb. 19, 1952 R. VELUT 2,586,399
DEVICE FOR COLLECTING LIQUIDS
Filed July 22, 1947 2 SHEETS—SHEET 2

INVENTOR
RENE VELUT
BY *Watson Cole Grindle & Watson*
ATTORNEYS

Patented Feb. 19, 1952

2,586,399

UNITED STATES PATENT OFFICE 2,586,399

DEVICE FOR COLLECTING LIQUIDS

René Velut, Francueil, France, assignor to Anciens Etablissements R. Velut (Société à Responsabilité Limitée), Paris, France, a company of France Application July 22, 1947, Serial No. 762,757
In France May 19, 1939

Section 1, Public Law 690, August 8, 1946
Patent expires May 19, 1959

6 Claims. (Cl. 261—112)

In a number of commercial processes, for instance in heat exchangers, coolers, dust removers etc., the purpose generally aimed at is to give a liquid a large free surface, spreading it out preferably on a wall the main direction of which is vertical, said wall being plane or corrugated and on which the liquid flows in a thin layer through gravity. At the lower portion of these apparatuses the liquid parts from the vertical wall and drips down in drops or streams irregularly distributed but generally spread over the entire breadth of the wall.

A well known process for collecting this liquid running at the lower portion consists in making it run into a basin arranged below the plate and extending over its entire breadth. This arrangement may present drawbacks, specially when air has to circulate vertically between two adjacent plates in order to produce either an evaporating action on the liquid running counter-flow either a filtering of the dust of the air, or any other action. The breadth of the basins collecting the water should indeed be larger than the breadth of the plates, which makes a narrow channel hindering the air circulation.

An object of the present invention is to provide a device for collecting liquid dripping down over one or both faces of a vertical plate, in one or several determined zones of the plate breadth, when that liquid in the course of its downflow reaches a given horizontal level or plane, in order to concentrate said liquid in that or those zones.

A further object of the invention is to provide a device for collecting a liquid dripping down over the surface of a plate into one or more basins spreading over only a part of the total width of the plate in order to reduce the narrow channel made by the consecutive basins.

It has been proposed for collecting liquid trickling on a plate, to provide said plate with corrugations generally spaced apart by a distance greater than their depth and sloping in the same direction with respect to a horizontal plane so as to constitute surfaces along which the liquid may flow transversely.

In such devices and on account of the wide mouthed shape generally used for said corrugations, only a small part of the liquid follows the corrugations, and most of the trickling liquid continues to fall vertically, so that to obtain a good efficiency of the plate it is necessary to provide a great number of corrugations, so that the device has a great height, somewhat clumsy for the apparatus in which it is placed.

The main object of the present invention is to provide an improved device more efficient and considerably shorter than the known devices for collecting liquid trickling down along vertical walls and able to collect liquids in one or several zones spaced along the breadth of the plate so as to clear, at the bottom of the device, the passage between two consecutive plates.

With said object in view the device for collecting liquid trickling down through gravity over the whole breadth of a vertical wall comprises, an upstanding plate, having about the same breadth as said wall, provided with transversely sloping projections having parallel walls, one end of which lies along a vertical zone, preferably one edge of said plate, said parallel walls being spaced apart so as to form between two consecutive projections capillary channels open laterally on one side of said plate and at their lower ends, the spacing of said projections being such with respect to the surface tension of the flowing down liquid that the liquid coming from the upper parts fills up said channels and forms owing to its surface tension a vertical wall extending between two consecutive projections.

It will be understood that as the transverse supply of the capillary channels in the direction of their slope is no longer a very thin film but represents a flow having the same cross section as the channels which are entirely filled, said flow is much greater than the flow which is obtained in the known devices having projections too far apart.

In the present specification the term "capillary" applied to a channel means that said channel is narrow enough for retaining, after being immersed into a liquid, and kept in a downward direction, a bulk of liquid filling it along a part of its length depending on the specific weight and surface tension of the liquid, said liquid forming along said length a fairly plane surface bridging the two opposite walls of said channel. For the usual aqueous liquids such a channel may be constituted between two parallel walls spaced apart by a distance not greater than four or five millimetres connected along one of their edges by a third wall at right angles with the first two.

The accompanying drawing shows as an example, an embodiment of the device according to the present invention in this last-mentioned case.

In this drawing:

Fig. 1 is a front elevation;

Fig. 2 is a side or end view of said embodiment:

Figure 3:
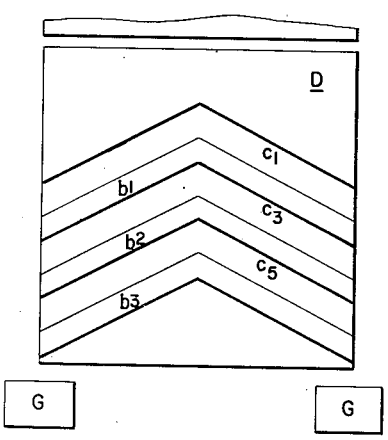
Fig. 3 shows a front elevation of an embodiment enabling to collect the liquid on both edges of the plate.

In the drawings, A represents one of the supporting plates on whose surfaces B and C a film of water flows and is evenly distributed.

Directly under this plate A and adjacent to the lower beveled edge thereof, a substantially square metallic thin sheet plate D is arranged. This plate D is corrugated, as shown, so as to form projections $a_1$, $a_2$, $a_3$ for the water dripping from the surface B of the plate A connected through parallel walls to projections $b_1$, $b_2$, $b_3$ for the water dripping from the surface C of said plate.

These projections are inclined on the horizontal, as shown in Figure 1 and form between them slanting capillary channels $C_2$, $C_4$, $C_6$, respectively, on the side of the surface B, and $c_1$, $c_3$, $c_5$ on the side of the opposite surface C of the plate A, these channels having approximately parallel walls and a flattened section.

Plate D corresponds in width to plate A, so as to have its opposite vertical edges E, F likewise aligned vertically with the corresponding vertical edges of the plate A.

The outlines of plate D bound on three sides each of the capillary channels $C_1$, $C_2$, $C_3$, $C_4$, $C_5$, $C_6$.

The height of these channels is small enough for enabling the liquid to be maintained between two projections through surface tension, but it should be sufficient for enabling the channels to be easily filled up. This height is thus dependent on the nature of the liquid to be collected. In the case of water, 4 to 5 millimetres are suitable dimensions.

The operation of the device is as follows:

The water spread out over the whole breadth of the surface B of the plate A flows into channel $c_2$, fills it and flows down its slope until it reaches the vertical edge F of the corrugated plate D.

If all the water dripping from said surface B of the plate A follows this path, the result sought is reached. If, on the contrary the flow through this channel $c_2$ is insufficient as regards the whole amount of water, the water in excess overflows the projection $a_2$ forming the bottom of said channel $c_2$, and penetrates into the next channel $c_4$, fills it and flows towards the lowermost end thereof, that is toward the vertical edge F of the corrugated plate D.

If all the water dripping down the face B of the plate A is thus drained off by these channels $c_2$ and $c_4$, the result sought is reached; if, on the contrary, the amount of water is still too large, the excess overflows the projections $a_3$ and flows transversely down the slope of the channel $c_6$ which it fills, and so on.

The number of successive channels should be sufficient to ensure that all the water supplied by the main plate A be drained off transversely towards the vertical edge F of the auxiliary plate D, and that no excess of this supply of water overflows the lowermost projection forming the bottom of the lowest channel.

Obviously, the projections $b_1$, $b_2$, $b_3$ and the channels $c_1$, $c_3$, $c_5$ will simultaneously and similarly act as deflectors for the water dripping down the surface C of the supporting plate A.

When the water reaches the lowermost ends of the oblique transversal capillary channels $c_1$, $c_2$, $c_3$, $c_4$, $c_5$, $c_6$, the weight of the water filling each of these channels is sufficient to overcome the effect of the surface tension of the water acting on the right hand open section of each channel along the vertical edge F, and the water is thus released from the channels and free to fall, for instance, in a collecting tank or basin G disposed as shown in Fig. 1, directly under the vertical edge F.

If the surface of the main plate A is too wide, or if the linear flow of liquid is too large thus requiring a great number of channels to reach the result aimed at, it may be preferable to divide the width of the plate into several vertical strips each comprising two sets of inclined channels, the channels of one set being inclined towards the left, those of the other set towards the right, or on the contrary those of one set sloping up towards the right and those of the other set towards the left.

Obviously, in the first case if it is assumed that the plate has only two strips, two collecting tanks or basins G will be required under the two vertical edges of the auxiliary plate D to receive the liquid flowing from the lowermost ends of the channels.

Figure 4:
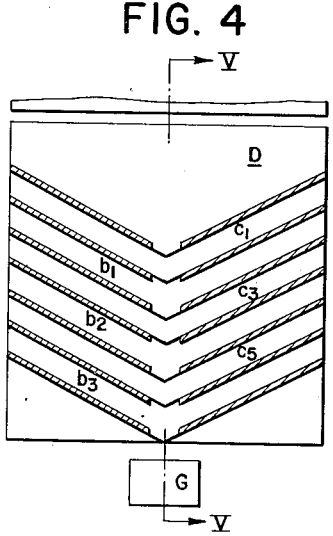
Fig. 4 is a transverse section taken on line IV—IV of Fig. 5 of another embodiment enabling to collect the liquid at the central portion of the plate.
Figure 5:
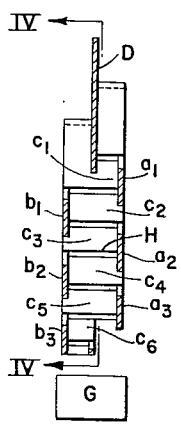
Fig. 5 is a vertical section taken on line V—V of Fig. 4.

In certain cases (see Fig. 4), it may even be advantageous to reverse the slopes of the channels and to have then on either half of the plate D independent channels starting at their adjacent lower ends at or near the vertical median of the plate D and sloping up towards its lateral edges thereof.

Obviously, in this last case, a single tank or basin G will be required; it will be located under the gaps H provided in the vertical median of the plate D between the adjacent lower ends of the channels.

Though, up to now, the object of the present invention has been defined and described as being a process and a device for collecting locally a liquid spread out over a relatively large surface, it is obvious that, by merely reversing this process and or this device it would be easy to obtain a process and a device for spreading out over a relatively large surface a liquid locally supplied.

In that case, the slanting channels have their entrances or highest points located directly under or substantially under the point or points of supply, while their lowermost points of exit are distributed over the whole breadth of this plate and suitably spaced apart so as to create a homogeneous spreading out of the liquid in a substantially continuous film at the bottom of this auxiliary plate D.

Obviously, this latter, instead of being arranged directly under the main supporting plate A, will have to be arranged directly above said main supporting plate A.

What I claim is:

1. Device for collecting a liquid tricking down over the whole breadth of a vertical wall comprising an upstanding plate having about the same breadth as said wall, provided with transversely sloping capillary channels open laterally on that face of the plate on the liquid which trickles, the lower extremities of said channels being opened and located along a vertical zone, said channels being formed with two parallel sides at right angles with respect to the surface of said plate connected by a third side parallel to said surface, and means for holding said plate under said vertical wall with its top close to the lower end of said wall and the same vertical plane, whereby the liquid tricking on said wall, falls on said plate, fills up said channels owing to its surface tension and flows along the sloping direction.

2. Device according to claim 1 in which said parallel sides of said capillary channels are spaced apart a distance not greater than 5 millimeters.

3. Device according to claim 1 in which the distance between the bottom of said capillary channels which is parallel to the surface of said plate, and the opposite open side of said channels is greater than 5 millimeters.

4. Device according to claim 1 in which said capillary channels are formed between projections provided on both faces of said plate whereby channels having an open side are formed on both faces of said plate.

5. Device according to claim 1 in which the breadth of the plate is sub-divided in two vertical strips, the capillary channels in each of said strips sloping downwards towards the corresponding lateral edges of the plate so as to provide a symmetrical arrangement with respect to the median vertical line of said plate and a V disposition, said channels having their apices on said median line and their lowermost extremities on the lateral edges of the plate.

6. Device according to claim 4 in which the breadth of the plate is sub-divided in two vertical strips, the capillary channels in each of said strips sloping downwards from the corresponding lateral edge of the plate so as to provide a symmetrical arrangement with respect to the median vertical line of said plate and a V disposition for said channels having their apices on said median line, said projections being cut away on said median line to provide gaps through which the collected liquid flows downwards.

RENÉ VELUT.

REFERENCES CITED

The following references are of record in the file of this patent:

UNITED STATES PATENTS

| Number | Name | Date |
|---|---|---|
| 457,533 | Heulings, Jr., et al. | Aug. 11, 1891 |
| 592,670 | Stilwell | Oct. 26, 1897 |
| 769,440 | Huxley | Sept. 6, 1904 |
| 1,519,739 | Aus der Mark | Dec. 16, 1924 |
| 1,654,826 | Moore | Jan. 3, 1928 |
| 1,810,090 | Sell | June 16, 1931 |

FOREIGN PATENTS

| Number | Country | Date |
|---|---|---|
| 378,607 | Germany | July 21, 1923 |
| 384,218 | Germany | Oct. 30, 1923 |